Figure 1:
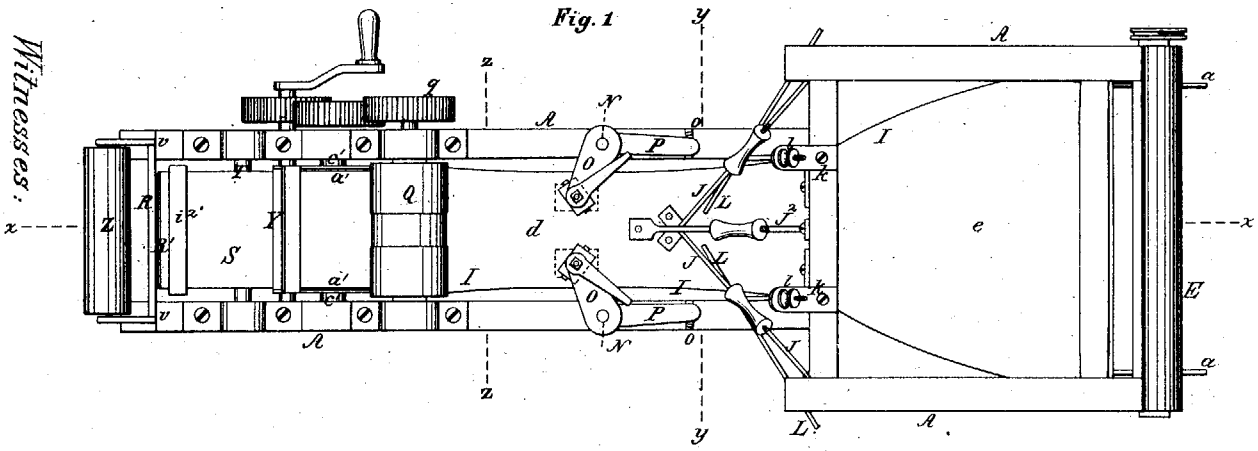

3 Sheets—Sheet 1.

J. ARKELL,

Assignor to himself, B. & A. SMITH.

Art of and Machine for Making Paper-Bags.

No. 8,680. Reissued April 22, 1879.

*Witnesses:*

Jacob Felbel

E. Wolff

*Inventor.*

James Arkell

By attorney

J. N. McIntire

J. ARKELL,

Assignor to himself, B. & A. SMITH.

Art of and Machine for Making Paper-Bags.

No. 8,680. Reissued April 22, 1879.

Witnesses:

Jacob Fettel

E. Wolff.

Inventor:

James Arkell

By attorney

J. N. Mc Intire

J. ARKELL,

Assignor to himself, B. & A. SMITH.

Art of and Machine for Making Paper-Bags.

No. 8,680. Reissued April 22, 1879.

Witnesses:
Jacob Felbel
E. Wolff.

Inventor:
James Arkell
by attorney
J. N. McIntire

UNITED STATES PATENT OFFICE.

JAMES ARKELL, OF CANAJOHARIE, NEW YORK, ASSIGNOR TO HIMSELF, BENJAMIN SMITH, AND ADAM SMITH, OF SAME PLACE.

IMPROVEMENT IN THE ART OF AND IN MACHINES FOR MAKING PAPER BAGS.

Specification forming part of Letters Patent No. 74,190, dated February 11, 1868; Reissue No. 8,680, dated April 22, 1879; application filed January 20, 1879.

*To all whom it may concern:*

Be it known that I, JAMES ARKELL, of Canajoharie, in the county of Montgomery and State of New York, have invented new and useful Improvements in the Art of Making Satchel-Bottom Bags, and in Machinery Employed in the Manufacture of such Bags; and that the following description, taken in connection with the accompanying drawings, hereinafter referred to, forms a full, clear, and exact specification of the same, wherein I have set forth the nature and principles of my said improvements, by which my inventions may be distinguished from all others of a similar class, and wherein I have particularly pointed out and claimed what I desire to have secured to me by Letters Patent.

This invention relates to improvements both in the art of making and in machinery employed in the art of making more particularly that kind of bags which is made from tubular blanks by cutting, folding up, and pasting together the stock at one of the open ends of the tubular blank, in such a manner as to form a satchel-bottom composed of four flap-like portions, each of single thickness, which kind of satchel-bottom bags was first shown, I believe, in the United States Letters Patent granted to Arkell and Smiths on the 25th day of April, 1865.

As a preliminary to the making of the bottoms of such bags, it is usual in the art to form the paper or other material from which the bags are to be manufactured into flattened tubular blanks by machinery operating to take a web of material from the roll, and as the material passes through the machine fold and paste it, over a former or otherwise, into one continuous flattened tube, and cut this tube up into lengths to form the bag-blanks, all in a manner well known to those skilled in the art.

To produce such satchel-bottom bags from such flattened tubular blanks, it is necessary to have certain cuts at one end of the blank and through both plies of the blank, in order to form the four flap-like portions of single thickness to which I have alluded.

That part of my invention which relates to an improvement in the art of making bags consists in making these cuts in the material from which the bags are to be manufactured while the material is in the flattened tubular condition, and before the continuous tubular blank is completely severed crosswise at such places as it may be necessary to cut or completely sever it to form the separate bag-blanks, whereby I am enabled not only to produce the said separate blanks for such bags with greater uniformity and perfection, but am also enabled to facilitate the rapid and economic manufacture of the article, since this mode of cutting the two plies of the blank may be effected by the simple means of cutters acting upon the material while it is in motion, and arranged, by preference, in connection with the mechanism for transforming the web of stock into the flattened tubular condition.

That part of my invention which relates to improvements in machinery employed in the art of making bags or employed in the manufacture of bags consists in numerous novel devices and combinations of devices, which I have embodied in an organized mechanism for transforming the web of material into a continuous flattened tube, and then slitting it and cutting it up into bag-blanks, which devices and combinations of devices will be found hereinafter more fully described, and particularly pointed out and specified in the claims hereinafter recited.

To enable those skilled in the art to fully understand and practice my invention, I will now proceed to more fully describe the several features of improvement making the subject-matter of this specification, referring by letters of reference to the accompanying drawings, in which I have illustrated my improvements both in the art of making and in machinery used in making satchel-bottom bags of the kind hereinbefore alluded to.

Figure 4:
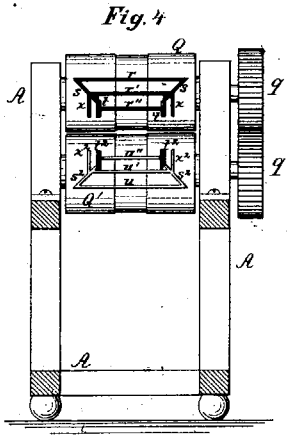
Figure 6:
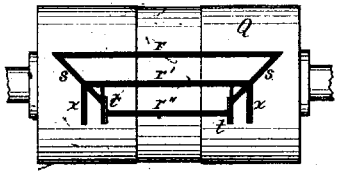
Figure 7:
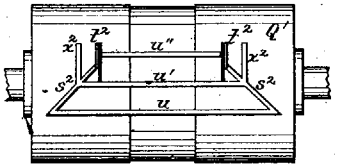
Figure 8:
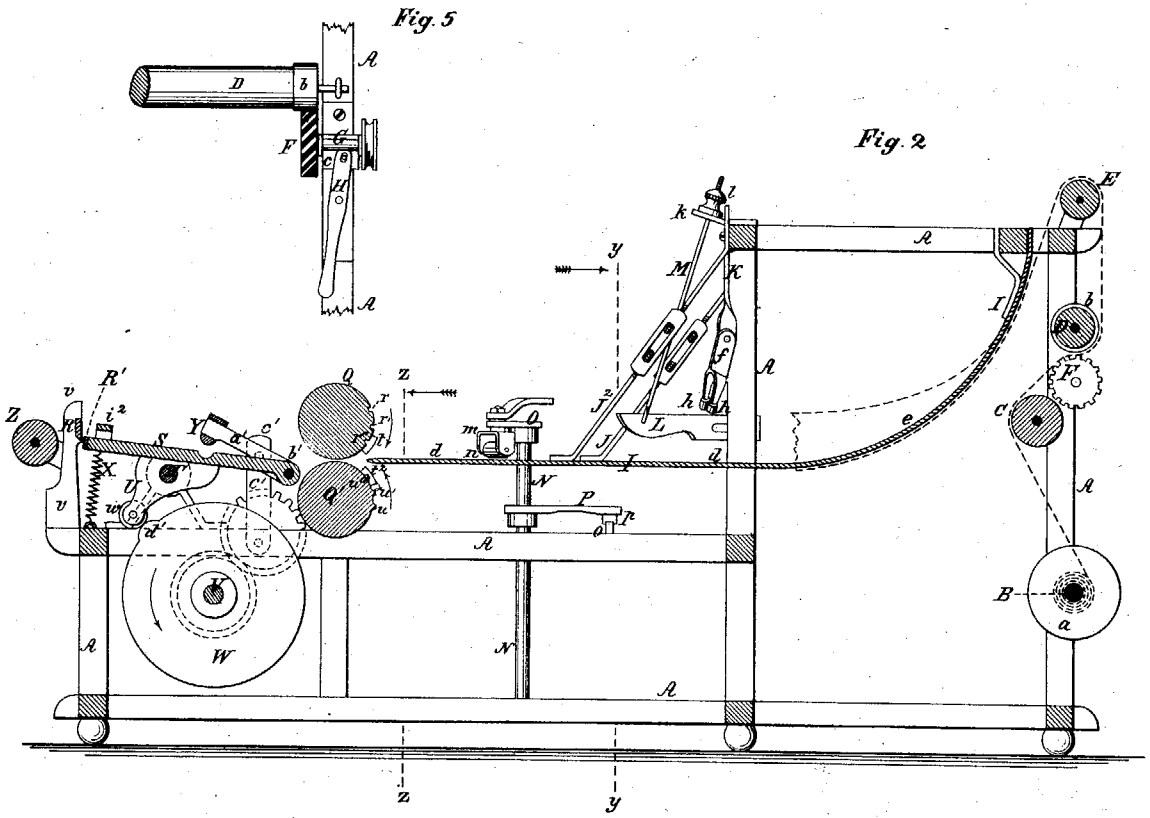
Figure 9:
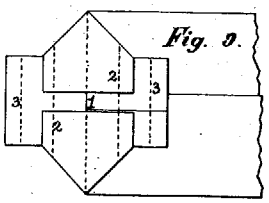
Figure 8:
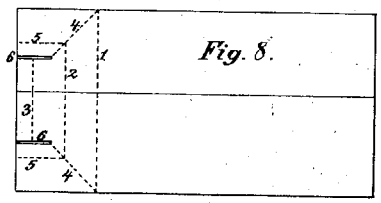
Figure 10:
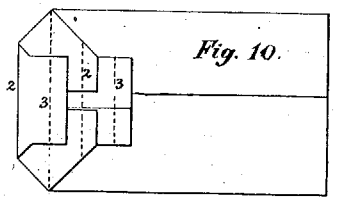
Figure 3:
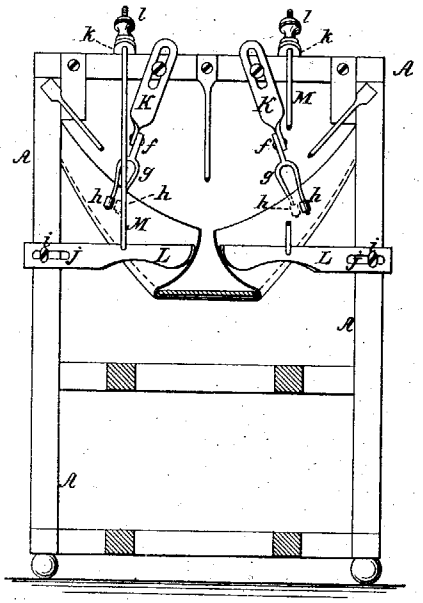

In the drawings, Figure 1 is a top view of a machine adapted to the practicing of that part of my invention relating to improvements in the art of making bags, and also embracing the several features of that part of my invention relating to improvements in machinery used in the manufacturing of bags. Fig. 2 is a vertical longitudinal section of the said machine, taken at the line *x x* of Fig. 1. Fig. 3 is a vertical cross-section at the line *y y*, Figs. 1 and 2, looking in the direction indicated by the arrow at Fig. 2. Fig. 4 is a similar section at the line *z z*, Figs. 1 and 2, looking in the direction indicated by the arrow at Fig. 2. Fig. 5 is a detail view of the paste-wheel, &c. Fig. 6 is an elevation, on an increased scale, of the upper one of the two creasing and cutting rolls, seen at Fig. 4; and Fig. 7 is a similar view of the lower one of said rolls. Figs. 8, 9, and 10 show, respectively, a single finished bag-blank, such as turned out by the machine shown, and several of the successive changes to which said bag-blank is subjected during its transformation into a satchel-bottom bag of that kind to which my invention more particularly relates, the dotted lines in said figures indicating the preliminary creases that are formed in the blank by the machine shown, to facilitate the several folding operations performed on the bag-blank to transform it into such kind of bag ready for the market, the finished bag-blanks, such as shown by Fig. 8, having been produced, it will be understood, from the continuously-formed flattened tubular blank, in which pairs of longitudinal slots or slits have been cut equidistant lengthwise of said blank before its severance crosswise into such bag-blanks.

In the several figures of the drawings similar letters of reference indicate the same part or device.

A is the frame of the machine, which may be constructed in any proper manner to support the working parts; and B is a shaft, having a circular flange, *a*, near each end, and adapted to contain a roll or wound web of paper or other material, which shaft is, by preference, supported, as shown, by said frame.

The paper to be operated upon, and which, as just said, is wound upon the shaft B in a continuous roll, passes from said shaft partially around tension-rollers C, D, and E, and thence downward beneath the former I, around which the paper is folded and pasted into a flattened tubular condition, and from whence it passes in said condition to the mechanisms for creasing, slitting, and severing into bag-blanks, all as will be hereinafter more fully explained.

I have illustrated the position and course of the web of paper partially, in Fig. 2, by broken lines, omitting it where its presence would interfere with a clear observation of the mechanism most important to be shown in said figure, and have omitted all representation of the paper in the other drawings of the machine, except at Fig. 3, which clearly illustrates the preliminary turning of the edges of the web upward and partially over the former.

The roller D has an india-rubber or other suitable flexible covering at *b*, near one end of it, which supports the paper against the action of a serrated or notched paste-wheel, F, which is mounted on the inner end of a small shaft, G, (most clearly seen at Fig. 5,) and which revolves in a paste-receptacle. (Not shown in the drawings.)

Said shaft G, on the outer end of which is fastened, as shown, a small pulley, is supported in the bearings of a small carriage, *c*, that is mounted on the frame A in such a manner as to be capable of adjustment in the direction of the length of said shaft, so that said carriage may be moved in one direction or the other by means of a hand-lever, H, the upper end of which is coupled to said carriage, and which is pivoted near its middle to the frame A of the machine, the object of having said carriage thus adjustable being to set the paste-wheel to apply the line of paste either closer to or farther from the edge of the web of material to be pasted, as may be desired.

I represents what I call a "former," composed preferably of a metal plate arranged in and attached to the frame A, and curved or bent in such a manner that, while one part, *d*, will occupy substantially a horizontal position, the other part, *e*, will extend upward with a gradual curvature to the top of frame A, and toward the roller E, mounted thereon, as most clearly shown at Fig. 2. This former I, the horizontal portion of which is about equal in width to that of the flattened tube formed upon it, gradually increases in width from said portion toward its uppermost portion, as most clearly shown in Fig. 1, and said former has its upper end rigidly secured to one of the cross beams or bars of the frame A, while its lowermost portion is supported by means of three rods or bars, J J $J^2$, in such a manner that said portion of the former may be adjusted in various directions, as and for the purposes to be presently explained.

The rods J J $J^2$ are composed each of two parts, connected by a screw-swivel, as shown, in such manner that the turning of said screw-swivel in one direction or the other will operate to lengthen or shorten said compound rod. As the upper ends of the said obliquely-arranged rods are attached to the frame A and the lower ends of said rods are fastened to the lowermost portion of the former I, it follows that any lengthening or shortening of said rods will operate to vary the position of the horizontal portion and lower end of the said former.

To the upper part of the frame A are adjustably attached two pendent bars, K K, having pivoted to their ends small arms *f f*, which terminate in bifurcated springs *g g*, that carry, respectively, at their lower extremities a pair of small anti-friction rollers, *h h*. The rollers *h h* of each spring *g* of each arm *f* are arranged about parallel with each other, and so that the paper which passes down from the upper tension-roller, E, underneath the curved part *e* of the former, and which is turned upward over the edges of said former, is drawn along between said rollers, each pair of which clasps the web of paper in the vicinity of one of its turned-up edges. This may be best seen by reference to Fig. 3 of the drawings.

L L represent two adjustable blades, each of which is connected at one end to the frame A by a pivotal clamping-screw, *i*, which passes through an oblong slot, *j*, in the blade, (see Fig. 3,) the opposite end of each of said blades being connected to the upper part of the frame A by a rod, M, which passes through a plate, *k*, and is provided at its upper end with a thumb-nut, *l*. These blades L L assist in turning over the paper onto the upper surface of the former, and may be adjusted as may be deemed expedient by turning the thumb-nuts *l* and by varying their positions relatively to the pivotal points *i*.

N N are two vertical shafts, arranged one at each side of the frame A, and having each a horizontal arm, O, at its upper end, said arms extending over the horizontal portion *d* of the former I, and being provided with swivel-brackets *m* at their adjacent ends, in which brackets *m* are hung presser-rolls *n*, adapted to press down the folded-over edges of the paper and complete the seaming operation. Each of the shafts N is provided with a lever, P, by means of which the said shaft may be turned and held in any desired position, a lip, *p*, on the outer end of the lever P engaging for this purpose with a rack, *o*, in the frame A, as shown in Figs. 1 and 2.

By such adjustment of the shafts N N the degree of obliquity of the arms O and the presser-rolls *n*, carried by said arms, may be varied as circumstances may require to produce such action of said presser-rolls upon the folded-down edges of the paper as will insure an even lap and a smooth perfect seam. This desirable end is also insured by a capacity for adjustment in the swivel-brackets *m*, which may be set at different degrees of obliquity relatively to the arms O, which carry them, the folded-down edges of the paper being drawn more or less to the right or left, as circumstances may require, by making use of the several adjustments alluded to.

To avoid undue friction between the folded-down portions of the material and the top surface of the former I, plates of glass or other smooth hard material may be let into the former I at such portions as lie directly underneath the localities of the presser-rolls *n*. (See Fig. 1, where the dotted rectangular figures illustrate such inserted plates of glass or other suitable material.)

Q Q′ are two cylinders or rolls, placed one over the other in the same axial plane, and having their shafts connected at one end, as shown, by spur-gears *g g*. The upper cylinder, Q, has three longitudinal and parallel grooves, *r r′ r″*, made in its periphery, (see Figs. 4 and 6,) and also two obliquely-arranged grooves, *s s*, located as shown in the drawings. Said cylinder has also two curved cutters, *t t*, fixed in its periphery and projecting slightly therefrom, said cutters being arranged, as shown, parallel with each other, and in planes at right angles to the axis of the cylinder, and two short grooves, *x x*, arranged parallel with each other and with the cutters. The lower cylinder, Q′, has three bars or creasing-ridges, *u u′ u″*, fitted longitudinally in and projecting from its periphery, which bars are parallel with each other, as shown at Figs. 4 and 6. Said cylinder is also provided with two cutters, $t^2$ $t^2$, and has two oblique creasing-bars, $s^2$ $s^2$, and two short bars, $x^2$ $x^2$, arranged parallel with each other and with the cutters, as shown.

The arrangement of the grooves, bars, and cutters of these two cylinders, Q Q′, and the manner of gearing together of said cylinders are such that, as the cylinders rotate, their grooves and bars, respectively, mesh together or engage with each other, while their cutters work together to make shearing cuts; and the effect of the working together thus of the peripheral devices of the cylinders is to crease and cut in a certain manner the paper or other material which is formed into a flattened tube on the former I, and passed between said cylinders, the latter also acting as drawing-rolls, to draw the flattened tubular blank through between them, and thus draw the paper from roll B.

The peculiar arrangement of the several grooves, bars, and cutters of the two cylinders will be best understood from the enlarged views, 6 and 7; and the effect produced on the stock by the action of said cylinders will be best seen by reference to Figs. 8 to 10, inclusive, and will be further alluded to hereinafter.

At that end of the frame A where the creased and cut bag-blanks are discharged there are two horizontal knives or cutters, R R′, the former, R, being fixed or stationary, and secured to upright bars *v v* on the frame A, while the other one, R′, is secured to one end of a plate or table, S, which is fitted upon and secured to a rock-shaft, T, that has a pendent arm, U, in the lower end of which is carried an anti-friction roller, *w*. (Best seen at Fig. 2.)

V is the driving-shaft of the machine, arranged in suitable bearings in the frame A, and carrying a cam-wheel, W, the face of which runs in contact with the roller *w* of arm U, the latter being kept in frictional contact with said cam by means of a spiral spring, X, which exerts a constant downward pull on the vibratory plate or table S, and thus, through the latter, shaft T, and arm U, (all three of which are made fast together,) keeps said roller against said cam, so that during the revolutions of the latter the projection *d′* will periodically move the lower end of arm U, and cause the plate or table S to oscillate in one direction about the axis of shaft T, for the purposes to be presently explained, said plate or table being oscillated in the other direction each time back to its normal position by the tensional action of spring X.

Y is a guide or loop, which operates to take up the slack in the tubular blank, as the paper in this form passes through the machine, in a manner to be presently explained. This take-up loop or device is composed of bars, one of which is always beneath the moving material, arranged at one end of two bars, *a′*

$a'$, the opposite ends of which are pivoted at $b^2$ $b'$ to one end of the vibratory plate or table S, as shown. The said bars $a'$ $a'$ are hinged near their centers to two uprights, $c'$ $c'$, which at their lower ends are pivoted to the frame A of the machine.

As clearly illustrated at Fig. 2, the lower bar of the take-up device Y (that one which is always under the traveling tube of paper) is flat on its upper surface, and when in its normal position lies in a groove cut crosswise in the top of the plate or table S for its accommodation, so that the top surface of said bar is coincident with the top surface of the plate or table S.

After the foregoing description of the several parts, and by reference to the drawings, the following brief explanation will suffice as to the operation of the machine.

The roll of paper at B having had its leading end passed upward round the tension-rollers C, D, and E, and thence down beneath the former I, as indicated by the broken lines at Fig. 2, and having been folded up over said former, with its edges entered between the two sets of rollers $h$ $h$, thence passed beneath the lower edges of the blades L L, and then passed along under the presser-rolls $n$ $n$, and, thus folded and pasted into a flattened tubular condition, into the bite of the drawing, creasing and cutting cylinders or rolls Q Q', is drawn off from the roll B rapidly and with a continuous uniform motion, and formed into bag-blanks, which are discharged over the roll Z into any suitable receptacle.

During the passage of the web of paper round the roller D a line of paste is put on near one edge by the paste-wheel F, and the paper, when bent up around and folded down on top of former I by the guidance of rolls $h$ $h$ and folders L L and the action of the presser-rolls $n$ $n$, has its opposite edges overlapped in such a manner that the pasted edge of the web comes down on top of the other edge, and thus the pasted seam is formed.

As the pasted flattened tube is drawn through between the cylinders Q Q' it has certain creases made in its two thicknesses or plies, and certain cuts made clean through both plies at given intervals in the direction of its length, the distances between the several sets of creases and cuts being equal and predetermined, of course, by the size of the said cylinders Q Q'.

The continuous flattened tube, thus properly cut and creased at intervals, passes along on top of the plate or table S, and below the stationary knife or cutter R, and thence over roller $z$ out of the machine. But at certain equidistant periods of its travel through the machine the said tubular blank is cut crosswise and severed into bag-lengths by the cutters R' R' in the following manner: Every time the projection $d'$ of cam W comes against the anti-friction roller $w$ of arm U the plate or table S is tipped or oscillated about the axis of rock-shaft T, in such manner and to such extent that the cutting-edge or knife at R' passes upward past the stationary knife R to a sufficient distance to effect the complete severance crosswise of the tubular blank, and then immediately resumes its normal (horizontal) position; but as this cutting operation necessarily stops the progress of the material for an instant (which is coming from the rolls Q Q' continuously) at the locality where the cutting is done, it becomes necessary to take up the slack that would otherwise accumulate between the point where the paper tube leaves the bite of rolls Q Q', and where it is being cut by knives R R'. This is done by the loop or guide Y before alluded to, for while the plate or table S is vibrating, as just mentioned, to effect the cutting, the loop Y gradually lifts or bows the stock upward into a curved line between its two points of confinement, and this not only prevents any buckling or crinkling of the stock, but also, by creating a tension on it, assists the action of the knives R R' to make a clean cut or complete severance of the material. As the plate or table S returns to its normal position by the action of spring X, the moving tubular blank is again permitted free and uninterrupted egress between the cutters R R' until another cutting operation occurs, the traveling tube re-assuming a horizontal position by reason of its natural tendency to lie flat on the table or plate S, on which it rides, this tendency, however, being assisted by the descent, at the same time plate S goes back to its horizontal position, of the guide-loop Y, which operates to force downward the paper tube should it be disinclined to come down without assistance.

To insure the descent with the cutting end of plate or table S of the cut end of the paper, so that it may then pass out freely between the separated knives R R' and over the discharge-roller Z, said plate is provided at $i^2$ with a bar arranged slightly above its level, beneath which bar the paper tube travels, and which bar acts to bring down the cut end of the paper tube, and prevent the possibility of its getting jammed against the stationary knife R, instead of passing beneath it, after the descent of plate or table S, and after the take-up device Y shall have permitted the paper tube to straighten out again.

During the running of the machine, as well as before starting it up, the former I and the presser-rolls $n$ $n$ are set and adjusted by the attendant as circumstances may require.

By lengthening or shortening the rod $J^2$, (or all of the former-rods,) the horizontal portion and lower end of the former I may be perceptibly raised or lowered, to vary the pressure or action upon the paper passing between the upper surface of said former and the rolls $n$ $n$, and to vary the position of the lower end of the former relatively to the bite of the rolls Q Q'; while by lengthening one of the rods J J and shortening the other, the position of the lower part and end of former I may be varied sidewise, so as to make the folded-over and pasted-down paper not only draw differently on the former, but also draw differently through the creasing and cutting cylinders and off of the former, according to the run of the web and inequalities in its thickness, &c.

This capacity of the former, around which the paper is drawn, folded, and pasted or seamed, to be adjusted by the attendant in various directions while the paper is being drawn from it by the rolls Q Q′ is quite important in a mechanism for making a flattened tube over a former continuously.

By having the former curved in the direction of its length, as shown and described, so as to bend the web of paper in the direction of its length, the gradual bending up of the edges of the web to make them overlap on top of the former is facilitated; and this is further facilitated by having the curved former increased gradually in width from the part which has to be equal to the width of the paper tube toward that part which extends away toward the approaching web and supply-roll.

The cylinders Q Q′ are, of course, made with a slightly-depressed belt at the middle, so that in drawing through them the freshly-pasted paper tube the lap will not be squeezed, so as to press out the wet paste and spoil the seam; and the arrangement of the cutters in the peripheries of said cylinders is, of course, such that the cutters of each roll work into depressions in the other roll, the two sets of cutters working against each other laterally, so as to make clean shearing cuts, as the cutters of the several rolls each pass through and through the paper-tube in opposite directions.

A reference to Figs. 6 and 7, and to the representation of the blank at Fig. 8, will show exactly how the creasing and cutting rolls operate and the effect they produce.

The several creasing-bars and corresponding grooves of the two cylinders indent or crease the flattened paper tube, as indicated by the dotted lines at Fig. 8, producing three parallel cross-creases, 1 2 3, of different lengths, two oblique creases, 4 4, of equal length, and two longitudinal creases, 5 5, while the cutters of said cylinders form two parallel slits in the flattened tube, as shown at 6 6 of said figure.

The tube thus creased and slitted is subsequently severed or cut up into bag-lengths at a line bisecting the continuously-formed flattened tubular blanks, at such localities as to cross the pairs of previously-formed slots or slits, and the result of such cutting up is a series of bag-blanks, such as seen in plan at Fig. 8.

These bag-blanks may be made up into satchel-bottom bags of the kind hereinbefore alluded to by first opening out the creased and cut end of the blank, as shown at Fig. 10, then folding over at one of the creases 2, as shown at Fig. 11, and then folding over at the other of said creases 2, applying the paste properly, of course, meantime to unite the flaps.

For convenience of packing and transportation, it may be expedient to then double the finished bottom on itself, in a manner well known to those familiar with the manufacture of satchel-bottom bags; and it is to facilitate the folding thus of the bottom (at the crease-line 1) that the creases 3 are made, which, when the two outer flaps are folded and pasted down, come coincident with said crease-line 1.

These Figs. 8 to 10, inclusive, with the foregoing explanations, make clear, I think, the nature of my improvement of the art of making bags, as well as the nature of the machine and method of working herein described and adopted for carrying out my said improvement in the art, the gist of which rests in subjecting the tubular blank made from the web of material to treatment which results in the formation of sets of parallel slits or cuts clean through both plies of the tube at equidistant points in the direction of the length of the tube, and subsequently completely severing the tube in such a manner that these slits or cuts will come at one end of each cut-off piece of tube, for the purposes of the manufacture of substantially the kind of satchel-bottom hereinbefore alluded to and described.

Having so fully shown and described both my improvement in the art of making paper bags and the improved machine employed by me in the manufacture of bags as to enable any person skilled in the art to fully understand and practice my invention, what I claim as new, and desire to secure by Letters Patent, is—

1. As an improvement in the art of making satchel-bottom bags, which have four flaps each of a single thickness, subjecting the continuous tubular blank of paper to a cutting operation, which results in the formation therein of slots or cuts at such localities and in such manner in the said tube that when the latter shall subsequently be completely severed crosswise at the proper lines that end of the tube at which the satchel-bottom is to be formed shall have cuts or slits in it, substantially as and for the purpose set forth.

2. A former the width of which is so gradually increased from that portion around which the flattened tube of material is to be formed toward that portion onto which the web of material is first fed, substantially as described, that it will operate to facilitate the gradual transformation of the paper from the web-like into the flattened tubular condition, as set forth.

3. A former made tapering in width, as described, and also curved in the direction of its length, all substantially in the manner and for the purposes described.

4. A former which at that portion where the formed tube leaves it to pass to the drawing-rolls is laterally adjustable, in substantially the manner described, for the purposes set forth.

5. A former which at that portion that operates in conjunction with the devices for pressing down the turned-over edges of the material to form the same is vertically adjustable, in substantially the manner and for the purposes described.

6. In combination with devices for feeding the material continuously and means for cutting the finished tube into bag-lengths, a take-up mechanism, whereby, while the material is continuously fed and cut crosswise by an intermittently-operating cut-off device, any liability of a clog in the moving material is avoided, all substantially as described.

7. In combination with the former and mechanism for drawing the material along, the spring-roller devices for clasping and holding up the partially-turned edges of the web, all substantially as described.

8. The combination, with a former and means for drawing the material along, of cutters adapted to pierce the tubular blank and form therein and in the direction of its length pairs of parallel slits or slots, all substantially as hereinbefore described.

9. In combination with means for continuously folding and pasting a web into a flattened tube, a roll having peripheral creasing devices adapted to crease the said tube at given localities, to facilitate the subsequent folding of the stock at such localities, all substantially as described.

10. In combination with a roll over the periphery of which the web of paper passes, a laterally-adjustable paste-wheel, as and for the purpose set forth.

11. The combination of the stationary cutter R, the vibratory plate or table S, having a cutting-edge, R′, and a device or means for insuring the descent of the end of the tube after the cutting-off operation, all substantially as hereinbefore set forth.

12. In combination with the former I, the adjustable folder-blades L L, substantially as and for the purpose set forth.

In testimony whereof I have hereunto set my hand and seal this 14th day of January, 1879.

JAS. ARKELL. [L. S.]

In presence of—
J. N. McINTIRE,
JACOB FELBEL.